United States Patent
Qian et al.

(10) Patent No.: US 7,818,019 B2
(45) Date of Patent: Oct. 19, 2010

(54) METHOD AND APPARATUS FOR OPTIMIZED ASSIGNMENT OF ABIS TRANSMISSION RESOURCES BASED ON DYNAMIC STATISTICAL TIME DIVISION MULTIPLEXING

(75) Inventors: Enyuan Qian, Pudong Jinqiao (CN); Huiyan Zhang, Pudong Jinqiao (CN); Lingfeng Lin, Pudong Jinqiao (CN); Jun Song, Pudong Jinqiao (CN); Yang Wu, Pudong Jinqiao (CN); Chunting Li, Pudong Jinqiao (CN); Yi Zhang, Pudong Jinqiao (CN); Ke Feng, Pudong Jinqiao (CN)

(73) Assignee: Alcatel Lucent, Paris (FR)

( * ) Notice: Subject to any disclaimer, the term of this patent is extended or adjusted under 35 U.S.C. 154(b) by 761 days.

(21) Appl. No.: 11/627,031

(22) Filed: Jan. 25, 2007

(65) Prior Publication Data

US 2007/0177543 A1 Aug. 2, 2007

(30) Foreign Application Priority Data

Jan. 27, 2006 (CN) ........................ 2006 1 0023717

(51) Int. Cl.
*H04B 7/00* (2006.01)

(52) U.S. Cl. ........................ 455/509; 455/522; 370/330; 370/349

(58) Field of Classification Search ................. 370/352, 370/330, 349; 455/509, 522

See application file for complete search history.

(56) References Cited

U.S. PATENT DOCUMENTS

| 2002/0003783 | A1 | 1/2002 | Niemela et al. | |
|---|---|---|---|---|
| 2004/0090948 | A1* | 5/2004 | Forssell et al. | 370/349 |
| 2007/0177543 | A1* | 8/2007 | Qian et al. | 370/330 |
| 2008/0081651 | A1* | 4/2008 | Kuroda et al. | 455/509 |
| 2008/0161033 | A1* | 7/2008 | Borran et al. | 455/522 |

FOREIGN PATENT DOCUMENTS

WO    WO 00/70890 A1    11/2000

OTHER PUBLICATIONS

Ball C F et al: "Performance analysis of dynamic TDM-transport for GSM voice and GPRS/EDGE packet data services" Vehicular Technology Conference, 2003. VTC 2003-Fall. 2003 IEEE 58$^{TH}$ Orlando, FL, USA Oct. 6-9, 2003, Piscataway, NJ, USA, IEEE, US, Oct. 6, 2003, pp. 2645-2649, XP010703063.

* cited by examiner

*Primary Examiner*—William D Cumming
(74) *Attorney, Agent, or Firm*—Fay Sharpe LLP

(57) ABSTRACT

The present invention relates to technique for optimized assignment of Abis transmission resources based on dynamic statistical time division multiplexing, the method comprising the steps of: assigning a set of 64 k TS's to GPRS/EGPRS services on an Abis link, the set of 64 k TS's shared among all BTS's connected to the Abis interface; a PCU assigning sufficient Abis transmission resources to a TRX based on the load thereof if the TRX has EGPRS services; a BSC interconnecting Abis transmission resources and BSC-PCU transmission resources and informing a BTS that said Abis transmission resources have been assigned to a TRE mapped to the TRX; the PCU reassigning bandwidth of the Abis transmission resources based on changes in the load of the TRX; in each TRX, all RTS's statistical-time-division-multiplexing all transmission resources of the TRX based on flow in different periods for different RTS's. The present invention will achieve dynamic sharing of Abis transmission resources on a RTS layer so as to optimize using of Abis transmission resources, reduce waste and decrease operating cost.

4 Claims, 4 Drawing Sheets

METHOD AND APPARATUS FOR OPTIMIZED ASSIGNMENT OF ABIS TRANSMISSION RESOURCES BASED ON DYNAMIC STATISTICAL TIME DIVISION MULTIPLEXING

CROSS-REFERENCE TO RELATED APPLICATIONS

This application is entitled to the benefit of Chinese Patent Application No. CN200610023717.3 filed on Jan. 27, 2006 with the Chinese Patent Office.

TECHNICAL FIELD

The present invention relates to Base Station System (BSS) of Global System for Mobile communication (GSM)/General Packet Radio Service (GPRS) network, particular to method and apparatus for optimized assignment of Abis (interface between a base transceiver station and a base station controller) transmission resources based on dynamic statistical time division multiplexing.

BACKGROUND ART

A GPRS BSS is comprised of a Base Transceiver Station including several transceivers (TRX), a Base Station Controller (BSC) and a Packet Control Unit and used for packet service processing and management of packet wireless channel resources at a BSS side.

GPRS is a packet data carrying service and used for discontinuous, burst and frequent data transmission. GPRS provides four different coding modes: CS-1 (9.05 Kbit/s), CS-2 (13.4 Kbit/s), CS-3 (15.6 Kbit/s) and CS-4 (21.4 Kbit/s). Enhanced Data rates for GSM Evolution (EDGE) is an interim scheme from GPRS to the $3^{rd}$ mobile communication so that existing network operators can provide users with personal multimedia communication services in advance using an existing wireless network device before commercialization of the $3^{rd}$ mobile network.

EDGE can be regarded as a general radio interface technique providing high bit rate and thus facilitating evolution of a cellular mobile system to functions of the $3^{rd}$ mobile network.

"High data throughput" of EDGE mainly profits from using an 8 Phase Shift Keying (8PSK) modulation techniques. In conjunction with channel coding schemes with different capacity of error correction, EDGE may provide 9 different modulation coding schemes (MSC), i.e. MCS1 (8.8 Kbit/s), MCS2 (11.2 Kbit/s), MCS3 (14.8 Kbit/s), MCS4 (17.6 Kbit/s), MCS5 (22.4 Kbit/s), MCS6 (29.6 Kbit/s), MCS7 (44.8 Kbit/s), MCS8 (54.4 Kbit/s), MCS9 (59.2 Kbit/s) so as to be adapted to more degraded and wider wireless propagation environment.

EDGE is introduced to provide an enhanced GPRS (E-GPRS) which occupies more Abis (an interface between the base transceiver station and the base station controller) transmission recourses, and it is certainly will result in increasing cost of operators to be provided with additional Abis transmission links.

At present, in order to support EDGE services, a BSS system usually utilizes the following three technical solutions:

Solution one: for TRXs supporting EDGE services, one or more 16 k sub-channels are statically assigned to each Radio Time Slot (RTS), but TRXs of all BTS's on one Abis link can not share 32 64 k Transmission Timeslots (TS's);

Solution two: TRXs of all BTS's on one Abis link may share 32 64 k TS's based on load thereof, but each RTS statically occupies fix bandwidth in the TRX;

Solution three: a portion of 64 k TS's on one Abis link are assigned to a specific BTS and only the TRX on this BTS can share the portion of transmission resources.

As to Solution one, if certain RTS's do not provide EGPRS services, they still occupy statically assigned Abis transmission resources, which results in waste. As to RTS's providing EGPRS services, if they can not achieve MCS9, they can not use statically assigned Abis transmission resources on full load, which also results in waste.

As to Solution two, Abis transmission resources are dynamically assigned based on TRX load to enhance efficiency, but coding mode of each RTS will adjusted in real time in the TRX. Some RTS's degrade from MCS9 to MCS1, but the occupied bandwidth thereof can not be shared with other RTS's, which result in waste of Abis transmission resources. Or, the modulation coding mode (CS1 through CS4, MCS1 through MCS9) is not integral multiple of the minimum assigned unit (usually 16 kbit/s), or data services carried on some RTS's pauses, but the occupied bandwidth thereof can not be shared with other RTS's, which also results in waste of Abis transmission resources.

As to Solution three, if BTS load on an Abis link is low, the occupied Abis resource thereof can not be shared with other BTS's, which also results in waste.

CONTENT OF THE INVENTION

The object of the present invention is to provide method and apparatus for Abis transmission resource optimized assignment based on dynamic statistical time division multiplexing in order to increase availability of Abis transmission links and avoid additional Abis links for introducing EDGE services.

The first of the present invention: a method for optimized assignment of Abis transmission resources based on dynamic statistical time division multiplexing, comprising the steps of: assigning a set of 64 k TS's to GPRS/EGPRS services on an Abis link, the set of 64 k TS's shared among all BTS's connected to the Abis interface; a PCU assigning sufficient Abis transmission resources to a TRX based on the load thereof if the TRX has EGPRS services; a BSC interconnecting Abis transmission resources and BSC-PCU transmission resources and informing a BTS that said Abis transmission resources have been assigned to a TRE mapped to the TRX; the PCU reassigning bandwidth of the Abis transmission resources based on changes in the load of the TRX; in each TRX, all RTS's statistical-time-division-multiplexing all transmission resources of the TRX based on flow in different periods for different RTS's.

In the above method for Optimized assignment of Abis transmission resources, the rule for the PCU reassigning bandwidth of the Abis transmission resources is that: if the load of a TRX decreases, the PCU releases redundant Abis transmission resources from the TRX and reassigns them to another TRX which needs additional Abis transmission resources; if the load of a TRX increases, the PCU adds difference Abis transmission resources to the TRX, which are obtained from transmission resources released from idle or other TRX's; if a TRX has no E-GPRS services, the PCU recalls the Abis transmission resources used for the TRX, which are multiplexed by other TRX's.

In the above method for Optimized assignment of Abis transmission resources, data blocks on respective RTS's are uninterruptedly and subsequently arranged among a set of sub-channels so that a plurality RTS's can multiplex one or more sub-channels.

The second of the present invention: a packet control unit

The packet control unit comprises an entity of packet control unit, characterized in further comprising a transmission resource assigning unit connected to the entity and a TRX load decision and adjusting unit connected thereto, the transmission resource assigning unit for assigning Abis transmission resources to a TRX having GPRS/EGPRS services and performing optimized assignment of bandwidth of transmission resources based on current using status of the Abis transmission resources and a predicted flow required on the TRX; the TRX load decision and adjusting unit for determining and predicting flow load of the TRX in real time and adjusting assignment of bandwidth of transmission resources on the TRX based on changes in load on the TRX.

In the above packet control unit, it further comprises a RTS multiplexing transmission resource unit for uninterruptedly and subsequently arranging data blocks on respective RTS's among a set of sub-channels so that a plurality RTS's can multiplex all sub-channels assigned to the TRX.

The third of the present invention: a method for controlling optimized assignment of Abis transmission resources in a packet control unit, comprising:

pre-assigning step for assigning Abis transmission resources with optimal bandwidth to a TRX having GPRS/EGPRS based on general using status of transmission resources; TRX load decision and adjusting step for determining and predicting flow load of the TRX in real time and adjusting assignment of bandwidth of transmission resources on the TRX based on changes in load on the TRX; re-assigning step for performing optimized assignment of transmission resources based on the adjusted bandwidth of Abis transmission resources on the TRX.

In the above method for controlling optimized assignment of Abis transmission resources, it further comprises a RTS multiplexing transmission resource step for uninterruptedly and subsequently arranging data blocks on respective RTS's among a set of sub-channels so that a plurality RTS's can multiplex all sub-channels assigned to the TRX.

The fourth of the present invention: a base transceiver station, comprising:

an entity of base transceiver station, characterized in further comprising a monitoring module for monitoring position of one or more sub-channels of actual transmission resources and bandwidth of transmission resources assigned to a TRX.

In the above base transceiver station, it further comprises a segment multiplexing module, communicated with a RTS multiplexing transmission resource unit in a packet control unit, for arranging data blocks obtained from a wireless channel among a set of sub-channels.

The fifth of the present invention: a base station controller, comprising:

an entity of base station controller, characterized in further comprising a connection means for interconnecting Abis transmission resources and BSC-PCU transmission resources based on Abis transmission resources assigned by a packet control unit, and forwarding correspondence between the Abis transmission resources and a TRX from the packet control unit to a monitoring module of a BTS to inform the BTS that the Abis transmission resources have been assigned to a TRE mapped to the TRX.

Using the above technical solutions, the present invention will achieve dynamic sharing of Abis transmission resources on a RTS layer so as to optimize using of Abis transmission resources, reduce waste and decrease operating cost.

MODE OF CARRYING OUT THE INVENTION

Figure 6A:
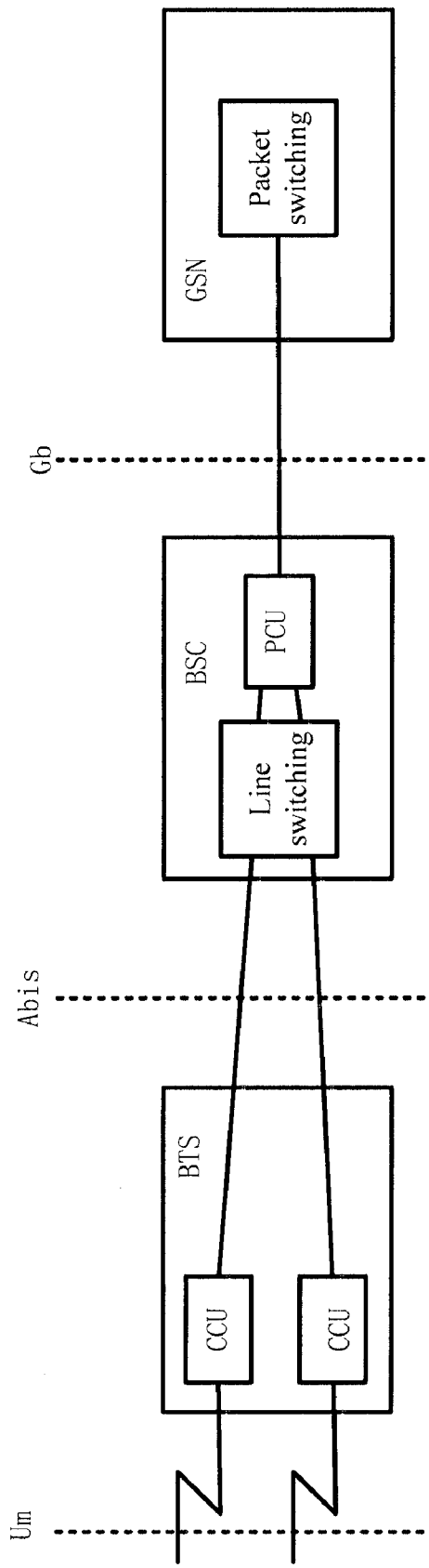
FIG. 6(a)-(b) are schematic diagrams showing two systems of alternative schemes relating to PCU in the 3rd Generation Partnership Project (3GPP).
Figure 6B:
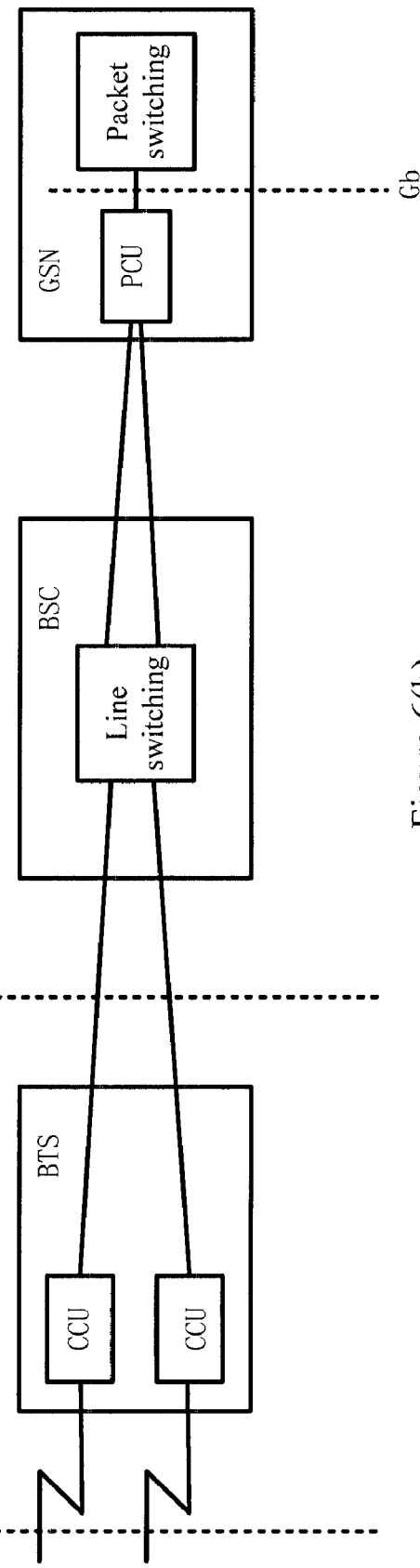

The technical contents of the present invention are based on the system illustrated in FIG. 6(a)-(b), in which the PCU is arranged at a BSC end or GPRS Supporting Node (GSN) end.

The basic idea is that TRXs of all BTS's on one Abis link share one or more 64 k TS's on this link based on the load thereof; all RTS's statistical-time-division-multiplex the transmission resources of the TRX in each TRX so as to implement dynamic sharing of Abis transmission resources on a RTS layer.

I. Method for Optimized Assignment of Abis Transmission Resources Based on Dynamic Statistical Time Division Multiplexing An operator may assign a set of 64 k TS's to EGPRS services on an Abis link by an Operation and Maintenance Center (OMC) with the set of 64 k TS's shared among all BTS's connected to the Abis link.

Figure 1:
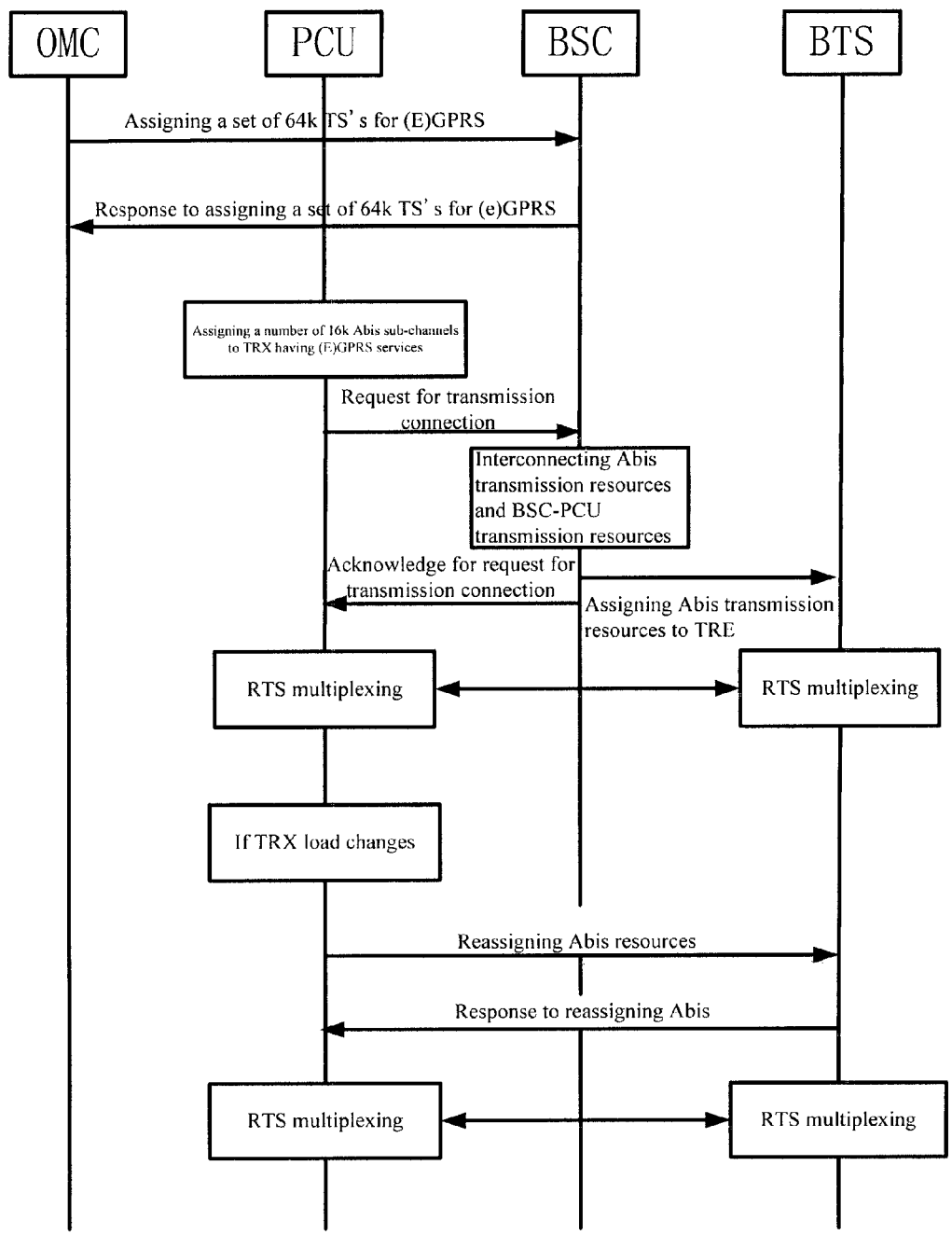
FIG. 1 is a schematic diagram showing optimized assignment of Abis transmission resources in accordance with the present invention.

Referring to FIG. 1, the method for optimized assignment of Abis transmission resources is a PCU assigning sufficient Abis transmission resources to a TRX on the BTS based on the load if the TRX has EGPRS services; a BSC interconnecting Abis transmission resources and BSC-PCU transmission resources and informing a BTS that said Abis transmission resources have been assigned to a Transceiver Equipment (TRE) mapped to the TRX; the PCU reassigning bandwidth of the Abis transmission resources based on changes in the load of the TRX.

If the load of a TRX decreases, the PCU releases some Abis transmission resources from the TRX and reassigns them to another TRX which needs additional Abis transmission resources.

If the load of a TRX increases, the PCU adds some Abis transmission resources to the TRX, which are obtained from transmission resources released from idle or other TRX's.

If a TRX has no E-GPRS services, the PCU recalls the Abis transmission resources used for the TRX, which maybe multiplexed by other TRX's.

In each TRX, all RTS's statistical-time-division-multiplex all transmission resources of the TRX based on flow in different periods for different RTS's The new solution of the present invention also introduces a new method for segment, that is, data blocks on respective RTS's are uninterruptedly and subsequently arranged among a set of sub-channels so that a plurality RTS's can multiplex one 16 k sub-channels and useless filling due to a 16 k sub-channel used by a single RTS can be cancelled.

II. Packet Control Unit PCU

Figures 2, 3:
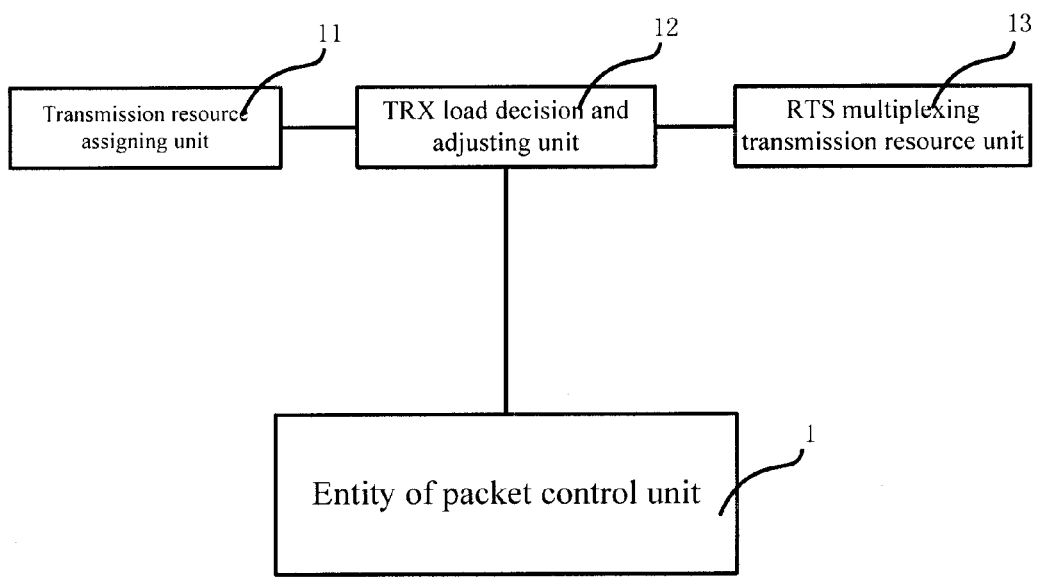
FIG. 2 is a schematic diagram showing segments of data blocks in accordance with the present invention.
FIG. 3 is a schematic diagram showing structure of a packet control unit in accordance with the present invention.

As shown in FIG. 3, the PCU comprises an entity 1 of packet control unit, a transmission resource assigning unit 11, a TRX load decision and adjusting unit 12 and a RTS multiplexing transmission resource unit 13 connected to the entity.

The transmission resource assigning unit 11 is used for assigning Abis transmission resources to a TRX having GPRS/EGPRS services and performing optimized assignment of bandwidth of transmission resources based on current using status of the Abis transmission resources and a predicted flow required on the TRX.

The TRX load decision and adjusting unit 12 is used for reassigning the Abis transmission resources based on changes in load on the TRX, i.e. determining and predicting flow load of the TRX in real time and adjusting assignment of bandwidth of transmission resources on the TRX with access of different mobile phones, mobility of the same mobile phone and changes in services.

The RTS multiplexing transmission resource unit 13 is used for uninterruptedly and subsequently arranging data blocks on respective RTS's among a set of 16 k sub-channels so that a plurality RTS's can multiplex one or more 16 k sub-channels.

III. Method for Controlling Optimized Assignment of Abis Transmission Resources in a Packet Control Unit, Comprising the Steps of:

pre-assigning step for pre-assigning Abis transmission resources with optimal bandwidth based on general using status of transmission resources, configured parameters of cell, types of accessed mobile phones (whether to support high rate EGPRS, the number of RTS's which can be monitored), types of services (QoS type, a guaranteed bit rate for real time type services) and etc.;

TRX load decision and adjusting step for detecting actual effective transmission of transmission resources assigned to the TRX and reassigning optimal bandwidth of transmission resource between TRX and different cells of the same base station based on changes in the numbers of mobile phones of different cells and different TRX's, changes in types of services and changes in requirement for transmission bandwidth.

RTS multiplexing transmission resource step for uninterruptedly and subsequently arranging data blocks on respective RTS's among a set of 16 k sub-channels so that a plurality RTS's can multiplex one or more 16 k sub-channels.

IX. Base Transceiver Station BTS

Figure 4:
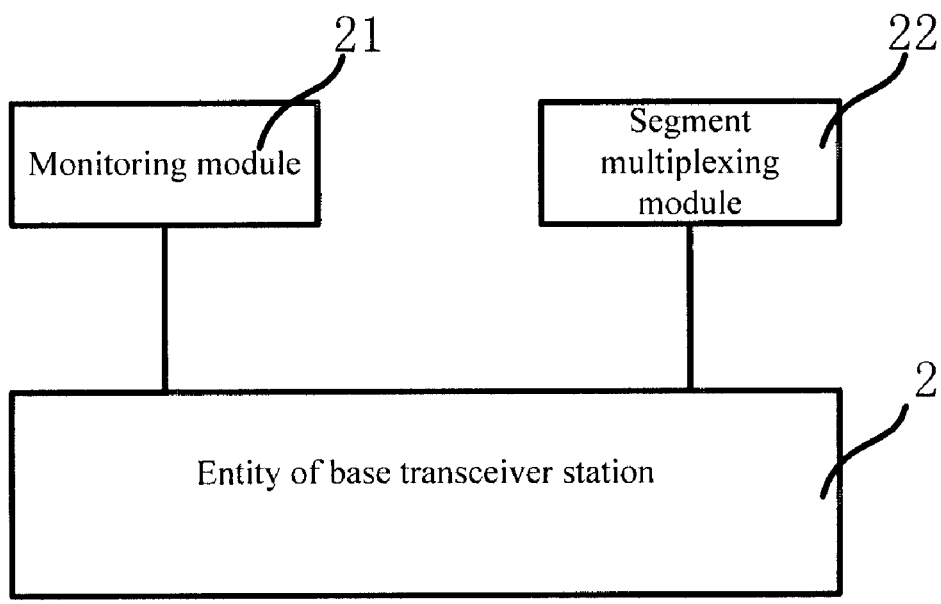
FIG. 4 is a schematic diagram showing structure of a base transceiver station in accordance with the present invention.

As shown in FIG. 4, the base station transceiver station comprises an entity 2 of base transceiver station, a monitoring module 21 and a segment multiplexing module 22.

The monitoring module 21 is used for monitoring position of one or more sub-channels of actual transmission resources and bandwidth of transmission resources assigned to a TRX.

The segment multiplexing module 22, communicated with the RTS multiplexing transmission resource unit 13, is used for arranging data blocks obtained from a wireless channel among a set of 16 k sub-channels or transmitting data blocks obtained from a set of 16 k sub-channels to different wireless channels based on different RTS's.

V. Base Station Controller BSC

Figure 5:
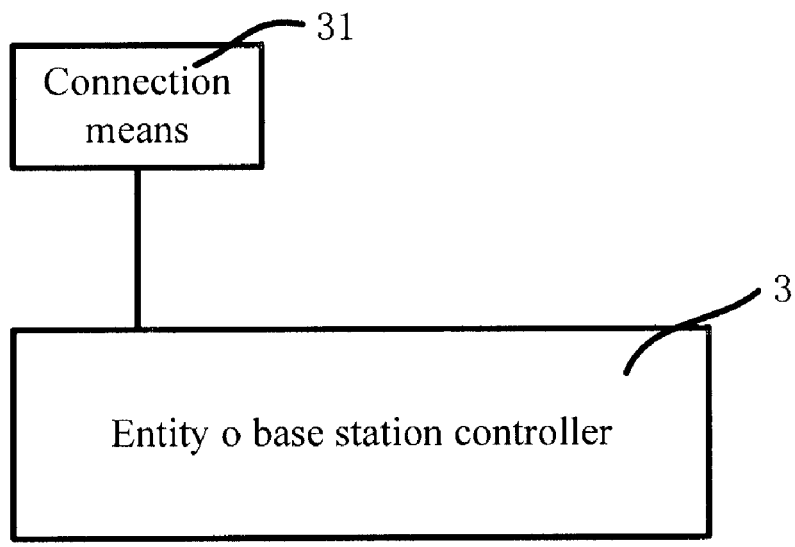
FIG. 5 is a schematic diagram showing structure of a base station controller in accordance with the present invention.

As shown in FIG. 5, the base station controller comprises an entity 3 of base station controller and a connection means 31.

The connection means 31 is used for interconnecting Abis transmission resources and BSC-PCU transmission resources based on Abis transmission resources assigned by the above packet control unit, and forwarding correspondence between the Abis transmission resources and a TRX from the packet control unit to a monitoring module of a BTS to inform the BTS that the Abis transmission resources have been assigned to a TRE mapped to the TRX.

The following are detailed description of optimized assignment of transmission resources in accordance with the present invention.

Generally, in order to simplify implementation, the existing BSS system uses a 16 k sub-channel as the minimum unit of Abis bandwidth. If a RTS can perform transmission using MCS9, it needs a transmission bandwidth of at least 59.2 k bit/s and four 16 k sub-channels (without considering overhead of bottom-layer protocols; much transmission bandwidth is required if it is considered). If all 8 RTS's can achieve MCS9, at least 32 16 k sub-channels are required.

In the present invention, any RTS on a TRX applies for Abis transmission resources based on current data flow. Since different RTS's may have different data flow, the PCU may assign less Abis transmission resources, i.e. less than 32 sub-channels per TRX.

It is assumed that one TRX has two RTS's carrying E-GPRS: RTS1 is in MCS1 and RTS2 is in MCS8.

According to an existing scheme, four 16 k sub-channels are assigned to each RTS and thus the PCU totally assigns eight 16 k sub-channels to the TRX.

With the new scheme of the present invention, MCS1 occupies bandwidth of 8.8K bit/s and only one 16 k sub-channel would meet requirement; MCS8 occupies bandwidth of 54.4 k bit/s and four 16 k sub-channels are required. Hence, five 16 k sub-channels are totally required and three ones are saved compared with the existing scheme.

In addition, the new solution of the present invention also introduces a new method for segment, that is, data blocks on respective RTS's are uninterruptedly and subsequently arranged among a set of sub-channels so that a plurality RTS's can multiplex one 16 k sub-channels and useless filling due to a 16 k sub-channel used by a single RTS can be cancelled.

As shown in FIG. 2, the method for segment of data blocks on a set of 16 k sub-channels is illustrated as follows:

There are two data blocks on the TRX with MCS1 data on RTS1 and MCS8 data on RTS2.

Based on the new method for segment of the present invention, transmission bandwidth of 63.2 k bit/s (8.8 k bit/s plus 54.4 k bit/s) is totally required and only four 16 k sub-channels would meet requirement. The MCS1 data is arranged at a first half of the first 16 k sub-channel and the MCS8 data is arranged at a second half of the first 16 k sub-channel as well as the second, third and fourth ones. The remaining of the fourth one is filled with filing bits due to no other data blocks to be transmitted. Another 16 k sub-channel would be saved using the method for segment of the present invention.

According to the above method for segment, if the data service originally transmitted using MCS-9 by a RTS pauses, then the saved bandwidth of 59.2 k bit/s would be used by other RTS's.

Summing up the above, the significant advantage of the present invention is to optimize using of Abis transmission resources, which reduces waste and decreases operating cost.

The above embodiments of the present invention have been presented by way of example only, and not limitation. It should be noted that various changes and modifications could be made by those skilled in the art herein without departing from the sprit and scope of the invention. Therefore, all equivalent technical solutions should belong to the scope of the present invention which should be limited by the attached claims.

The invention claimed is:

1. A packet control unit providing assignment of Abis transmission resources, wherein Abis is an interface between a base transceiver station and a base station controller, the packet control unit comprising:
   a packet control unit entity;
   a transmission resource assigning unit connected to the packet control unit entity assigning Abis transmission resources to a Base Transceiver Station transceiver (TRX) having General Packet Radio Service/Enhanced General Packet Radio Service (GPRS/EGPRS) services and performing assignment of bandwidth of transmission resources based on current using status of the Abis transmission resources and a predicted flow required on the TRX; and
   a TRX load decision and adjusting unit connected to the transmission resource assigning unit determining and predicting flow load of the TRX in real time and adjusting assignment of bandwidth of transmission resources on the TRX based on changes in load on the TRX.

2. The packet control unit claimed in claim 1, further comprising a Radio Time Slot (RTS) multiplexing transmission resource unit connected to the TRX load decision and adjusting unit uninterruptedly and subsequently arranging data blocks on respective RTS's among a set of sub-channels so that a plurality of RTS's can multiplex all sub-channels assigned to the TRX.

3. A method for controlling assignment of Abis transmission resources in a packet control unit, wherein Abis is an interface between a base transceiver station and a base station controller, the method comprising:
   pre-assigning step assigning Abis transmission resources with optimal bandwidth to a Base Transceiver Station (TRX) having General Packet Radio Service/Enhanced General Packet Radio Service (GPRS/EGPRS) based on general using status of transmission resources;
   TRX load decision and adjusting step determining and predicting flow load of the TRX in real time and adjusting assignment of bandwidth of transmission resources on the TRX based on changes in load on the TRX; and
   re-assigning step performing assignment of transmission resources based on the adjusted bandwidth of Abis transmission resources on the TRX.

4. The method for controlling assignment of Abis transmission resources claimed in claim 3, further comprising:
   a Radio Time Slot (RTS) multiplexing transmission resource step uninterruptedly and subsequently arranging data blocks on respective RTS's among a set of sub-channels so that a plurality of RTS's can multiplex all sub-channels assigned to the TRX.

* * * * *